Patented July 31, 1951

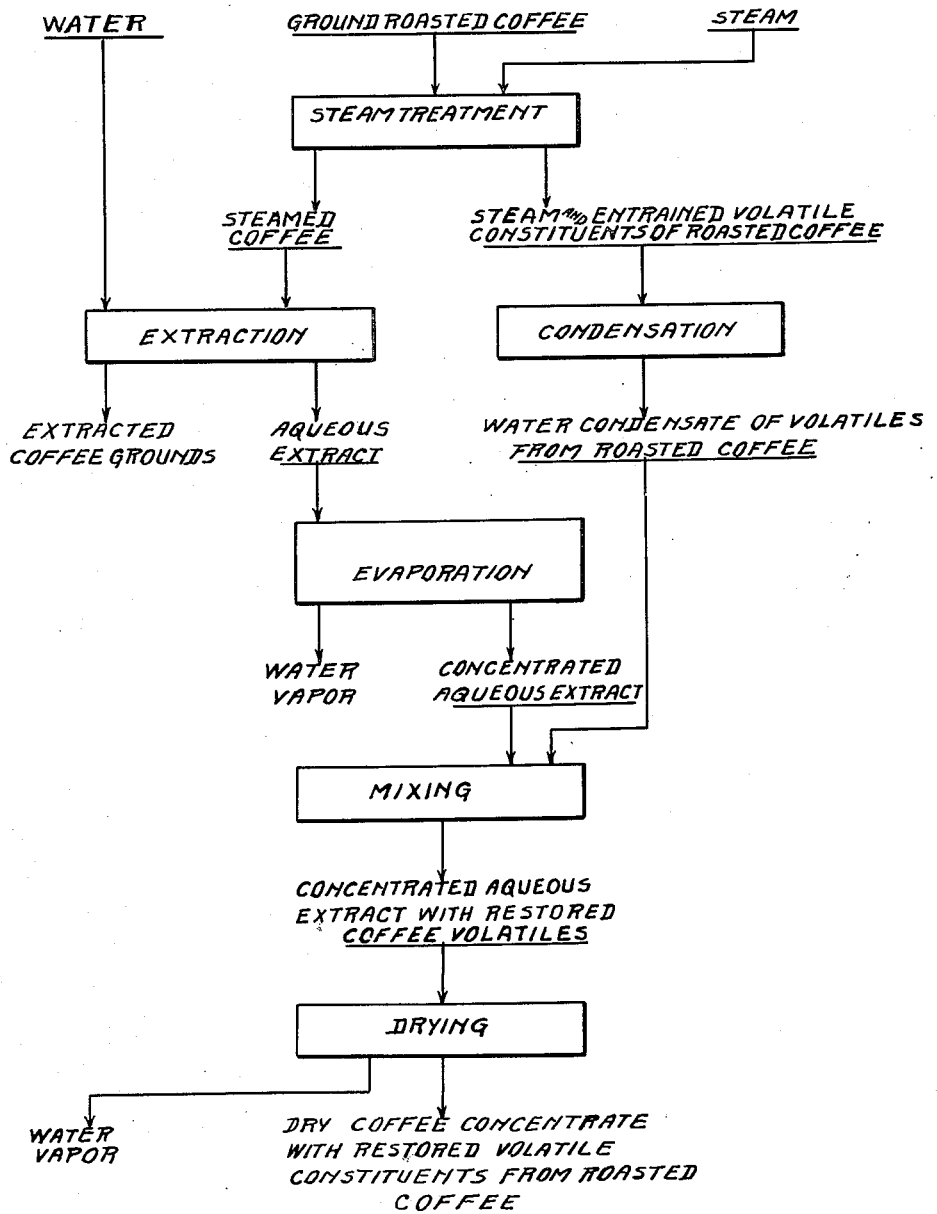

2,562,206

UNITED STATES PATENT OFFICE 2,562,206

PROCESS OF PREPARING A COFFEE CONCENTRATE

Lee Nutting, Berkeley, Calif., assignor to Hills Bros. Coffee, Inc., San Francisco, Calif., a corporation of California Application May 19, 1947, Serial No. 749,049

6 Claims. (Cl. 99—71)

This invention relates to a coffee concentrate, and to a method of producing the same, which concentrate will contain the volatile flavor giving elements of roasted coffee.

Coffee concentrates, as heretofore prepared, have either lost, or there has been largely destroyed or damaged during the processing, certain of the volatile constituents of the coffee, leaving in the concentrate chiefly the non-volatile constituents of the coffee which are dissolved by, or dispersed in, the extracting medium.

The preparation of a coffee brew from the roasted coffee beans results in the extraction from the beans of two distinct types of constituents, which, for the purpose of describing this process of preparing a coffee concentrate, I choose to classify as (1) the water soluble and, or water dispersible non-volatile materials and (2) the volatile constituents which include essential flavor elements of roasted coffee. The first class comprises the bulk of the concentrate while the second class contains a small quantity of flavor elements essential to product quality. Certain of the essential flavor elements are ordinarily lost, destroyed or damaged, in the processes practiced for preparing coffee concentrates. However, I have also found that certain constituents of the first class of non-volatile substances are somewhat susceptible to process damage and that extreme or prolonged processing conditions are detrimental to the quality of the final product. One of the advantages of the process of this invention is that it permits a relatively rapid treating of the roasted coffee so as to eliminate, or reduce to a minimum, such susceptible process damage as heretofore experienced.

A further advantage of my invention is the fact that the volatile constituents are first removed from the roasted coffee. This permits me to handle the volatile constituents under conditions favorable to the retention of the initial qualities of the essential volatile flavor elements. Another advantage resulting from the initial removal of the volatile constituents is the fact that I may then carry out the subsequent aqueous extraction of the roasted coffee, and then the concentration of this aqueous extract, considering only those conditions necessary to protect the qualities of the non-volatile constituents of the roasted coffee contained therein. This permits me to carry out the same with better results than if an attempt were made to concentrate the aqueous coffee extract containing the volatile constituents thereof.

It is one of the objects of my invention to provide a method for the preparation of a coffee concentrate, which method includes the steps of (1) separating the volatile constituents from roasted coffee (2) separating the non-volatile water soluble or water dispersible constituents from the coffee, and (3) combining the products of the two steps named.

It is a further object of my invention to provide a method of preparing a coffee concentrate including the separation from the ground roasted coffee beans of the volatile constituents, separately preparing a water extraction of the roasted coffee after the volatile constituents have been removed, then concentrating the water extract, and after the process of concentrating the water extract and prior to drying thereof, mixing with the concentrated water extract the separated volatile constituents, and then drying the resultant mix to give the final product.

It is a further object of my invention to provide a method of preparing a coffee concentrate including the separation from the ground roasted coffee beans of the volatile constituents in such a manner as to produce a water solution or suspension of these constituents, separately preparing a water extraction of the roasted coffee after the volatile constituents have been removed, then concentrating the water extract to a semi-solid or a dry state, dissolving the concentrated material in the solution or suspension of the volatile constituents, and then drying the resultant mixture to give the final product.

It is a further object of this invention to separate the volatile constituents from the roasted coffee by means of a steam treatment process.

Other objects and advantages of this invention, it is believed, will be apparent from the following detailed description of a preferred embodiment thereof as the same is illustrated in the accompanying flow sheet.

In accordance with my invention, the ground roasted coffee is treated with steam in an enclosed chamber or a steam jacketed container in which the coffee is supported upon a screen, and the steam is caused to pass through the coffee. The result of this process first is a uniform addition of moisture to the ground coffee due to the condensation upon the coffee of water derived from the steam. This increase of the moisture content of the ground roasted coffee results in the development and liberation of the volatile constituents. Also, the steaming of the roasted coffee opens the cellular structure thereby facilitating the removal of the volatile constituents and permitting rapid extraction and rapid draining in the course of the subsequent extraction of the non-volatile constituents of the roasted coffee. As the steam is continued to be passed through the coffee, the volatile substances liberated are carried away with the steam. The steam containing the volatile constituents derived from the coffee is condensed and cooled. There is thus formed a distillate, or condensate, composed of volatile constituents of the coffee in water.

Following the removal of the volatile constituents from the ground roasted coffee, a water extraction is then made of the water soluble or water dispersible constituents of the coffee. This extraction is preferably made with water which is boiling or is heated to near the boiling point in order to hasten the rate of extraction. While this steeping to extract the non-volatile constituents may be performed in a single operation, I have found that this extraction is best carried out in three successive steps using separate volumes of boiling water. Each of these steps in the process for the extraction of the non-volatile constituents includes (1) applying a definite volume of boiling water to the ground roasted coffee (2) steeping the coffee for a suitable period of time to extract the non-volatile water soluble, or water dispersible constituents and (3) draining the resultant extract from the coffee bed. The extracts resulting from the three steeping steps are combined and concentrated. I prefer to carry out the concentration of the aqueous extraction by evaporation under a reduced pressure in order to lower the temperature under which the evaporation takes place. This minimizes the possibility of changes in the non-volatile constituents during the concentration process. After the aqueous extraction has reached a suitable degree of concentration it is mixed with the condensate containing the volatile constituents initially separated from the coffee by means of the steam treatment. The concentrated extract, including both the aqueous extraction and the volatile constituents, is then rapidly dried. This produces a dry coffee concentrate containing not only the aqueous extractives, but also the volatile constituents of the roasted coffee with their essential flavor elements.

An alternative method of recombining the volatile constituents obtained from the ground roasted coffee is accomplished in the following manner. The extraction containing the non-volatile constituents is evaporated to give a solid or a semi-solid product, or an extraction of high solids content. This product is then dissolved in the solution or suspension of the volatile constituents obtained by steaming the ground roasted coffee. The resulting mixture is dried by a suitable rapid drying process to produce a dry coffee concentrate having restored therein the volatile constituents of the coffee including essential flavor elements.

It is to be noted that in either of the foregoing alternatives the mixture as prepared for the final drying constitutes an aqueous concentrate of ground roasted coffee containing both the water soluble and water dispersible non-volatile materials and the volatile constituents which include essential flavor elements of roasted coffee and, as such, could be regarded as a final product.

My invention may be carried out equally well by means of either a batch or a continuous process.

As a specific example of my invention, but not necessarily limiting the same to the specific times, temperatures or proportions set forth, which may vary considerably for different types, blends, conditions of roast and grinds of coffee, the following is given:

Finely ground freshly roasted coffee, initially at room temperature, is subjected to the action of steam at atmospheric pressure in a steam-jacketed apparatus. The coffee is supported upon a screen so that the steam passes through the bed of the ground roasted coffee. When the steam is first supplied to the coffee, the steam condenses on the coffee, while heating it, to increase, uniformly, the moisture content of the ground roasted coffee. During this initial period substantially all of the steam is condensed on and absorbed by the coffee in the bed. In this interval the zone in which the steam condenses on the coffee advances through the coffee bed. Until this is completed there is no flow of steam beyond the coffee. This addition of moisture and warming of the roasted coffee by means of the latent heat of the steam condensed, causes rapid liberation of the volatile constituents. The quantity of moisture uniformly condensed by each particle of coffee, while it is being warmed to steam temperature, is not sufficient to give the ground roasted coffee a wet appearance.

The steam jacket serves to prevent heat losses from the steaming chamber and aids in keeping the take up of moisture by the coffee as uniform as possible. If it were not for the steam jacket, steam would condense on the inner surfaces of the apparatus and excess moisture would be taken up by coffee adjacent to the walls, resulting in a localized complete saturation of the coffee particles. The latter type of wetting of the coffee leads to a reduction in the yield of volatile constituents obtained by the steam treatment of ground roasted coffee.

In operation, the ground roasted coffee at room temperature is placed on a screen in the steaming chamber. The apparatus is closed and steam is introduced uniformly by a spreader to the bed of coffee. Simultaneously, steam is supplied to the steam jacket surrounding the bed of coffee. This method of operation avoids any localized wetting of the coffee referred to above.

The steam is continued to be admitted to the coffee and ultimately passes through the coffee carrying away with it the volatile substances. The steam and volatiles mixture passes into a water-cooled condenser and is condensed to give a water solution or suspension of the volatile constituents. As the steaming of the roasted coffee continues, I have found that the concentration of the volatile substances in the distillate decreases. The quantity of distillate obtained per unit weight of coffee may be varied in accordance with the needs of the further steps in the preparation of the dry coffee concentrate.

After the steaming of the coffee is completed it is then extracted by steeping with three successive portions of boiling water. I use less water than the amount normally used in brewing coffee directly for beverage use in order to minimize the amount of water which subsequently must be evaporated. However, the extraction of the ground roasted coffee using three successive portions of water permits me to obtain a satisfactory and economical yield of the non-volatile extractives with this reduced quantity of water.

The amount of water in the aqueous extraction obtained above is then decreased by a reduced pressure evaporation to give a total solids content, after combining with the aqueous solution of the volatile constituents, suitable for use in the final rapid drying step. Within the limits of practical operating conditions I desire to hold to a minimum the amount of water in the mixture of volatile and non-volatile constituents which is dried to give the final product.

The concentrated mixture prepared above is then put through a rapid drying step to give the final product. The dry product produced by the methods described makes a beverage of satisfactory cup strength on the basis of approximately 1.5 grams of the dry coffee concentrate per 100 cc. of hot tap water. This beverage, in large measure, possesses the normal characteristics of a brew freshly prepared from ground roasted coffee. It is of particular note that the beverage has the same pleasant after taste as that of the freshly brewed coffee.

Having fully described my invention, it is to be understood that I do not wish to be limited to the details herein set forth, but my invention is of the full scope of the appended claims.

I claim:

1. A process of preparing a dry coffee concentrate with restored volatile flavor constituents including the steps of introducing steam into the ground roasted coffee to wet and to liberate the volatile constituents thereof, condensing the steam and volatiles mixture to form an extract of the volatile constituents of the coffee, subsequently treating the ground roasted coffee with water to form an aqueous extraction, concentrating the aqueous extraction to reduce the water content thereof, then mixing the concentrated aqueous extract with the extract of the volatile constituents and then drying the mixture.

2. A process of preparing a dry coffee concentrate with restored volatile flavor constituents including the steps of introducing steam into the ground roasted coffee to wet and to liberate the volatile constituents thereof, condensing the steam and volatiles mixture to form an extract of the volatile constituents of the coffee, subsequently treating the ground roasted coffee with water to form an aqueous extraction, concentrating the aqueous extraction to reduce the water content thereof, then mixing the concentrated aqueous extract with the extract of the volatile constituents and then concentrating the mixture.

3. A process of preparing coffee concentrates which includes the steps of wetting and liberating from ground roasted coffee the volatile constituents by treating the same with steam and then collecting the volatiles, then treating the coffee with water to form an aqueous extraction of the non-volatile constituents of the coffee, concentrating the water extraction from the coffee, combining the concentrated water extraction with the separately collected volatile constituents, and then drying the combined extractions.

4. A process of preparing a dry coffee concentrate with restored volatiles, including the steps of passing steam through ground roasted coffee to wet and to liberate the volatile constituents thereof, collecting and condensing the steam and volatiles together to form an extract of volatiles, then making an aqueous extraction of the coffee, concentrating the aqueous extraction to a semi-solid or dry state, mixing the said product with the extract of volatiles, and drying the mixture to form a dry concentrate.

5. A process of preparing a dry coffee concentrate with restored volatiles, including the steps of passing steam through ground roasted coffee to wet and to liberate the volatile constituents thereof, condensing the mixture of steam and volatiles, treating the coffee with water to form an aqueous extraction of the non-volatile constituents of the coffee, concentrating the aqueous extraction under vacuum, then mixing the volatile constituents with the concentrated aqueous extraction, and drying the combined extractions.

6. A process of preparing a coffee concentrate including the steps of wetting ground coffee and then extracting the volatile constituents of the coffee to form a small volume of water extract containing said volatile constituents and then passing water through the ground coffee to prepare a water extract therefrom after the volatiles have been removed, concentrating the latter extract by volatilizing water therefrom, mixing the first volatile extract with the concentrate of the latter extract, and then concentrating the mixture.

LEE NUTTING.

REFERENCES CITED

The following references are of record in the file of this patent:

UNITED STATES PATENTS

| Number | Name | Date |
| --- | --- | --- |
| 439,318 | Barotte | Oct. 28, 1890 |
| 1,123,827 | Whitaker et al. | Jan. 5, 1915 |
| 1,123,828 | Whitaker et al. | Jan. 5, 1915 |
| 1,251,359 | Etaix | Dec. 25, 1917 |
| 1,367,716 | Pratt et al. | Feb. 8, 1921 |
| 2,098,961 | Fronmuller | Nov. 16, 1937 |

FOREIGN PATENTS

| Number | Country | Date |
| --- | --- | --- |
| 2,013 | Great Britain | 1913 |
| 289/26 | Australia | July 13, 1926 |